United States Patent Office 2,866,818
Patented Dec. 30, 1958

2,866,818

STABILIZATION OF SALTS OF SORBIC ACID USING AMINES

Amelio E. Montagna, South Charleston, and Everett R. Lashley, Charleston, W. Va., assignors to Union Carbide Corporation, a corporation of New York No Drawing. Application February 4, 1957
Serial No. 637,893

34 Claims. (Cl. 260—526)

This invention is directed to chemical processes and the product thereof. More particularly, it is directed to the stabilization of salts of sorbic acid by the use of amines.

Many potential uses of sorbic acid require the acid in the form of its water soluble salt. Aqueous solutions of such salts are convenient to make as well as use and can be transported readily. Such solutions of aqueous salts, however, have a strong tendency to darken and discolor upon normal storage. This darkening is undesirable, particularly when the acid is to be used in foods, and is indicative of deterioration.

We have now discovered that the deterioration and attendant discoloration of aqueous solutions can be effectively inhibited by the addition to such solutions of small quantities of certain amines. The precise mechanism by which this inhibition is achieved is not fully understood. We have, however, tested a number of the common antioxidants or inhibitors for this purpose and found most to be totally ineffective and the rest distinctly inferior to our amines.

The amines which are useful as inhibitors according to our invention are characterized by having a nucleus represented by the formula:

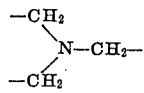

wherein two of the CH$_2$ groups have each attached to them an organic group containing only one carbon atom, such as the methylol, sodium carboxylate or carboxylate groups. These organic groups may be identical or different in a particular inhibitor compound. The third CH$_2$ group may also have attached to it an organic group containing only one carbon atom, such as the methylol, sodium carboxylate or carboxylate groups or it may have atached to it a group represented by the formula:

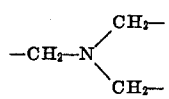

wherein each of the other two CH$_2$ groups has attached to it an organic group containing only one carbon atom, such as the methylol, sodium carboxylate or carboxylate groups. These organic groups may be identical or different in a particular inhibitor compound.

The compounds used in our invention may be also represented as amines having the formula:

wherein R$_1$ is an organic group containing a total of two carbon atoms, such as the —CH$_2$—CH$_2$—OH, —CH$_2$—COOH or —CH$_2$—COONa groups, and R$_2$ is either defined in the same way as R$_1$ or is represented by the formula:

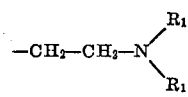

wherein R$_1$ is as defined above.

The compounds according to our invention could thus be considered to be either tertiary amines represented by the formula:

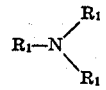

or tertiary amine derivatives of ethylenediamine represented by the formula:

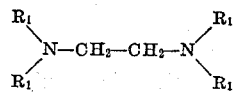

with R$_1$ in either case being as defined above.

Particular amine compounds suitable for use in our invention include the monosodium salt of N,N-bis-2-hydroxyethyl glycine, ethylenediaminetetraacetic acid, the monosodium salt of ethylenediaminetetraacetic acid, the disodium salt of ethylenediaminetetraacetic acid, the trisodium salt of ethylenediaminetetraacetic acid, the tetrasodium salt of ethylenediaminetetraacetic acid, the monosodium salt of N-hydroxyethyl ethylenediaminetriacetic acid, the disodium salt of N-hydroxyethyl ethylenediaminetriacetic acid, the trisodium salt of N-hydroxyethyl ethylenediaminetriacetic acid and the like.

According to our invention, an amine as defined above is added to a water-soluble salt of sorbic acid, or a solution of such a salt, in the amount of at least 0.0005 part by weight of an amine per 100 parts by weight of the sorbate salt. While as much amine as desired could be added to the sorbate solution, we have been unable to detect any increased stabilization with amounts above 2.5 parts by weight of amine per 100 parts by weight of sorbate. We prefer to add between 0.001 and 0.5 part by weight of amine per 100 parts by weight of sorbate. Our amines are effective in the above proportions regardless of the concentration of the sorbic acid salt in solution. They are effective as inhibitors in preventing deterioration and darkening of any of the water soluble salts of sorbic acid, such as sodium sorbate, potassium sorbate, calcium sorbate, lithium sorbate, barium sorbate, rubidium sorbate, cesium sorbate, beryllium sorbate, magnesium sorbate, strontium sorbate and the like. Sorbate salts produced by the oxidation of 2,4-hexadienal can, if desired, be stabilized according to our invention by adding the amines to the oxidation reaction mixture in the ratios given above, based on sorbate salt produced.

In the course of our study of the stability of aqueous solutions of sorbic acid salts under various conditions we found that oxygen can cause severe deterioration of such solutions as measured by the development of color. We therefore employed oxygen as a deteriorating agent for accelerated tests of color stability. For the test solution, we employed an aqueous solution consisting of 25 parts by weight of sodium sorbate and 75 parts by weight of water. A light-colored test solution of this composition was prepared from pure sorbic acid which had been recrystallized from water in the presence of decolorizing charcoal. This recrystallized sorbic acid was dissolved in aqueous sodium carbonate solution to yield the aqueous sodium sorbate solution containing 25 parts by weight of sodium sorbate per 75 parts by weight of water. This solution had an initial color of only 15 on the platinum-cobalt scale.

Our accelerated stability tests were made by exposing aqueous sodium sorbate solution containing inhibitors (as well as uninhibited control solutions) to oxygen under stringent conditions. This is done by maintaining the solutions at a temperature of about 100° C. while bubbling oxygen through the solutions for a period of eight hours. As a control, an aqueous solution consisting of 25 parts by weight of sodium sorbate and 75 parts by weight of water, as described above, was maintained at a temperature of 100° C. while oxygen was bubbled through it for a period of eight hours. During this time the color of the solution increased from 15 on the platinum-cobalt scale to a color of 12 Gardner.

Example I

An aqueous test solution consisting of 25 parts by weight of sodium sorbate and 75 parts by weight of water was employed. To this solution was added 0.004 part by weight of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 150 on the platinum-cobalt scale.

Example II

An aqueous test solution consisting of 25 parts by weight of sodium sorbate and 75 parts by weight of water was employed. To this solution was added 0.04 part by weight of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 150 on the platinum-cobalt scale.

Example III

An aqueous test solution consisting of 25 parts by weight of sodium sorbate and 75 parts by weight of water was employed. To this solution was added 0.4 part by weight of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 150 on the platinum-cobalt scale.

Example IV

An aqueous test solution consisting of 25 parts by weight of sodium sorbate and 75 parts by weight of water was employed. To this solution was added 0.004 part by weight of the tetrasodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 400 on the platinum-cobalt scale.

Example V

An aqueous test solution consisting of 25 parts by weight of sodium sorbate and 75 parts by weight of water was employed. To this solution was added 0.04 part by weight of the tetrasodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 125 on the platinum-cobalt scale.

Example VI

An aqueous test solution consisting of 25 parts by weight of sodium sorbate and 75 parts by weight of water was employed. To this solution was added 0.4 part by weight of the tetrasodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 100 on the platinum-cobalt scale.

Example VII

An aqueous test solution consisting of 25 parts by weight of sodium sorbate and 75 parts by weight of water was employed. To this solution was added 0.004 part by weight of the monosodium salt of N,N-bis-2-hydroxyethyl glycine per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 4 Gardner.

Example VIII

An aqueous test solution consisting of 25 parts by weight of sodium sorbate and 75 parts by weight of water was employed. To this solution was added 0.04 part by weight of the monosodium salt of N,N-bis-2-hydroxyethyl glycine per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 100 on the platinum-cobalt scale.

Example IX

An aqueous test solution consisting of 25 parts by weight of sodium sorbate and 75 parts by weight of water was employed. To this solution was added 0.4 part by weight of the monosodium salt of N,N-bis-2-hydroxyethyl glycine per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 100 on the platinum-cobalt scale.

Example X

An aqueous test solution consisting of 25 parts by weight of sodium sorbate and 75 parts by weight of water was employed. To this solution was added 0.004 part by weight of the trisodium salt of N-hydroxyethyl ethylenediaminetriacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 350 on the platinum-cobalt scale.

Example XI

An aqueous test solution consisting of 25 parts by weight of sodium sorbate and 75 parts by weight of water was employed. To this solution was added 0.04 part by weight of the trisodium salt of N-hydroxyethyl ethylenediaminetriacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 300 on the platinum-cobalt scale.

Example XII

An aqueous test solution consisting of 25 parts by weight of sodium sorbate and 75 parts by weight of water was employed. To this solution was added 0.4 part by weight of the trisodium salt of N-hydroxyethyl ethylenediaminetriacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 100 on the platinum-cobalt scale.

*Example XIII*

An aqueous test solution consisting of 25 parts by weight of sodium sorbate and 75 parts by weight of water was employed. To this solution was added 0.004 part by weight of the disodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 300 on the platinum-cobalt scale.

*Example XIV*

An aqueous test solution consisting of 25 parts by weight of sodium sorbate and 75 parts by weight of water was employed. To this solution was added 0.04 part by weight of the disodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 300 on the platinum-cobalt scale.

*Example XV*

An aqueous test solution consisting of 25 parts by weight of sodium sorbate and 75 parts by weight of water was employed. To this solution was added 0.4 part by weight of the disodium salt of ethylenediaminetetraacetic acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 300 on the platinum-cobalt scale.

What is claimed is:

1. A stabilized solution of a salt of sorbic acid comprising a water-soluble salt of sorbic acid, water and, per 100 parts by weight of said salt of sorbic acid, at least 0.0005 part by weight of an amine characterized by having the nucleus represented by the formula:

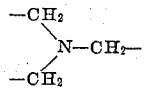

wherein two of the $CH_2$ groups have each attached to them an organic group containing only one carbon atom.

2. A stabilized solution of a salt of sorbic acid comprising a water soluble salt of sorbic acid, water and, per 100 parts by weight of said salt of sorbic acid, from 0.001 to 0.5 part by weight of an amine characterized by having the nucleus represented by the formula:

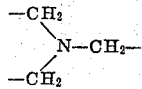

wherein two of the $CH_2$ groups have each attached to them an organic group containing only one carbon atom.

3. A stabilized solution of a salt of sorbic acid comprising a water-soluble salt of sorbic acid, water and, per 100 parts by weight of said salt of sorbic acid, at least 0.0005 part by weight of ethylenediaminetetraacetic acid.

4. A stabilized solution of a salt of sorbic acid comprising a water-soluble salt of sorbic acid, water and, per 100 parts by weight of said salt of sorbic acid, at least 0.0005 part by weight of the tetrasodium salt of ethylenediaminetetraacetic acid.

5. A stabilized solution of a salt of sorbic acid comprising a water-soluble salt of sorbic acid, water and, per 100 parts by weight of said salt of sorbic acid, at least 0.0005 part by weight of the trisodium salt of N-hydroxyethyl ethylenediaminetriacetic acid.

6. A stabilized solution of a salt of sorbic acid comprising a water-soluble salt of sorbic acid, water and, per 100 parts by weight of said salt of sorbic acid, at least 0.0005 part by weight of the disodium salt of ethylenediaminetetraacetic acid.

7. A stabilized solution of a salt of sorbic acid comprising a water-soluble salt of sorbic acid, water and, per 100 parts by weight of said salt of sorbic acid, at least 0.0005 part by weight of the monosodium salt of N,N-bis-2-hydroxyethyl glycine.

8. A stabilized solution of the sodium salt of sorbic acid comprising sodium sorbate, water and, per 100 parts by weight of said sodium sorbate, at least 0.0005 part by weight of an amine characterized by having the nucleus represented by the formula:

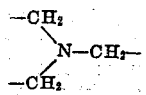

wherein two of the $CH_2$ groups have each attached to them an organic group containing only one carbon atom.

9. A stabilized solution of the potassium salt of sorbic acid comprising potassium sorbate, water and, per 100 parts by weight of said potassium sorbate, at least 0.0005 part by weight of an amine characterized by having the nucleus represented by the formula:

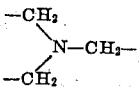

wherein two of the $CH_2$ groups have each attached to them an organic group containing only one carbon atom.

10. A stabilized solution of the lithium salt of sorbic acid comprising lithium sorbate, water and, per 100 parts by weight of said lithium sorbate, at least 0.0005 part by weight of an amine characterized by having the nucleus represented by the formula:

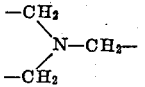

wherein two of the $CH_2$ groups have each attached to them an organic group containing only one carbon atom.

11. A stabilized solution of the calcium salt of sorbic acid comprising calcium sorbate, water and, per 100 parts by weight of said calcium sorbate, at least 0.0005 part by weight of an amine characterized by having the nucleus represented by the formula:

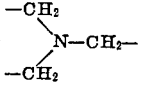

wherein two of the $CH_2$ groups have each attached to them an organic group containing only one carbon atom.

12. A stabilized solution of the barium salt of sorbic acid comprising barium sorbate, water and, per 100 parts by weight of said barium sorbate, at least 0.0005 part by weight of an amine characterized by having the nucleus represented by the formula:

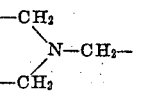

wherein two of the $CH_2$ groups have each attached to them an organic group containing only one carbon atom.

13. A stabilized solution of the sodium salt of sorbic acid comprising sodium sorbate, water and, per 100 parts by weight of said sodium sorbate, at least 0.0005 part by weight of ethylenediaminetetraacetic acid.

14. A stabilized solution of the sodium salt of sorbic acid comprising sodium sorbate, water and, per 100 parts by weight of said sodium sorbate, at least 0.0005 part by weight of the tetrasodium salt of ethylenediaminetetraacetic acid.

15. A stabilized solution of the sodium salt of sorbic acid comprising sodium sorbate, water and, per 100 parts by weight of said sodium sorbate, at least 0.0005 part by weight of the tri-sodium salt of N-hydroxyethyl ethylenediaminetriacetic acid.

16. A stabilized solution of the sodium salt of sorbic acid comprising sodium sorbate, water and, per 100 parts by weight of said sodium sorbate, at least 0.0005 part by weight of the disodium salt of ethylenediaminetetraacetic acid.

17. A stabilized solution of the sodium salt of sorbic acid comprising sodium sorbate, water and, per 100 parts by weight of said sodium sorbate, at least 0.0005 part by weight of the monosodium salt of N,N-bis-2-hydroxyethyl glycine.

18. A process for stabilizing an aqueous solution of a salt of sorbic acid which comprises adding to said solution, per 100 parts by weight of said salt of sorbic acid, at least 0.0005 part by weight of an amine characterized by having the nucleus represented by the formula:

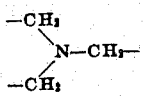

wherein two of the CH$_2$ groups have each attached to them an organic group containing only one carbon atom.

19. A process for stabilizing an aqueous solution of a salt of sorbic acid which comprises adding to said solution, per 100 parts by weight of said salt of sorbic acid, from 0.001 to 0.5 part by weight of an amine characterized by having the nucleus represented by the formula:

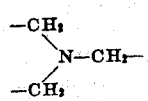

wherein two of the CH$_2$ groups have each attached to them an organic group containing only one carbon atom.

20. A process for stabilizing an aqueous solution of salt of sorbic acid which comprises adding to said solution, per 100 parts by weight of said salt of sorbic acid, at least 0.0005 part by weight of ethylenediaminetetraacetic acid.

21. A process for stabilizing an aqueous solution of a salt of sorbic acid which comprises adding to said solution, per 100 parts by weight of said salt of sorbic acid, at least 0.0005 part by weight of the tetrasodium salt of ethylenediaminetetraacetic acid.

22. A process for stabilizing an aqueous solution of a salt of sorbic acid which comprises adding to said solution, per 100 parts by weight of said salt of sorbic acid, at least 0.0005 part by weight of the trisodium salt of N-hydroxyethyl ethylenediaminetriacetic acid.

23. A process for stabilizing an aqueous solution of a salt of sorbic acid which comprises adding to said solution, per 100 parts by weight of said salt of sorbic acid, at least 0.0005 part by weight of the disodium salt of ethylenediaminetetraacetic acid.

24. A process for stabilizing an aqueous solution of a salt of sorbic acid which comprises adding to said solution, per 100 parts by weight of said salt of sorbic acid, at least 0.0005 part by weight of the monosodium salt of N,N-bis-2-hydroxyethyl glycine.

25. A process for stabilizing an aqueous solution of sodium sorbate which comprises adding to said solution, per 100 parts by weight of said sodium sorbate, at least 0.0005 part by weight of an amine characterized by having the nucleus represented by the formula:

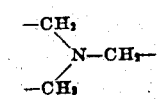

wherein two of the CH$_2$ groups have each attached to them an organic group containing only one carbon atom.

26. A process for stabilizing an aqueous solution of potassium sorbate which comprises adding to said solution, per 100 parts by weight of said potassium sorbate, at least 0.0005 part by weight of an amine characterized by having the nucleus represented by the formula:

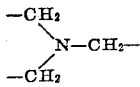

wherein two of the CH$_2$ groups have each attached to them an organic group containing only one carbon atom.

27. A process for stabilizing an aqueous solution of lithium sorbate which comprises adding to said solution, per 100 parts by weight of said lithium sorbate, at least 0.0005 part by weight of an amine characterized by having the nucleus represented by the formula:

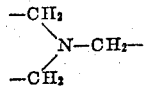

wherein two of the CH$_2$ groups have each attached to them an organic group containing only one carbon atom.

28. A process for stabilizing an aqueous solution of calcium sorbate which comprises adding to said solution, per 100 parts by weight of said calcium sorbate, at least 0.0005 part by weight of an amine characterized by having the nucleus represented by the formula:

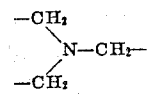

wherein two of the CH$_2$ groups have each attached to them an organic group containing only one carbon atom.

29. A process for stabilizing an aqueous solution of barium sorbate which comprises adding to said solution, per 100 parts by weight of said barium sorbate, at least 0.0005 part by weight of an amine characterized by having the nucleus represented by the formula:

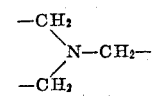

wherein two of the CH$_2$ groups have each attached to them an organic group containing only one carbon atom.

30. A process for stabilizing an aqueous solution of sodium sorbate which comprises adding to said solution, per 100 parts by weight of said sodium sorbate, at least 0.0005 part by weight of ethylenediaminetetraacetic acid.

31. A process for stabilizing an aqueous solution of sodium sorbate which comprises adding to said solution, per 100 parts by weight of said sodium sorbate, at least 0.0005 part by weight of the tetrasodium salt of ethylenediaminetetraacetic acid.

32. A process for stabilizing an aqueous solution of sodium sorbate which comprises adding to said solution, per 100 parts by weight of said sodium sorbate, at least 0.0005 part by weight of the trisodium salt of N-hydroxyethyl ethylenediaminetriacetic acid.

33. A process for stabilizing an aqueous solution of sodium sorbate which comprises adding to said solution, per 100 parts by weight of said sodium sorbate, at least 0.0005 part by weight of the disodium salt of ethylenediaminetetraacetic acid.

34. A process for stabilizing an aqueous solution of sodium sorbate which comprises adding to said solution, per 100 parts by weight of said sodium sorbate, at least 0.0005 part by weight of the monosodium salt of N,N-bis-2-hydroxyethyl glycine.

References Cited in the file of this patent

FOREIGN PATENTS 574,504     Great Britain _____ Jan. 8, 1946

OTHER REFERENCES

Fryklof: Chem. Abs., vol. 48 (1954), col. 8486.